(12) United States Patent
Okabe (10) Patent No.: US 8,286,525 B2
(45) Date of Patent: Oct. 16, 2012

(54) GEAR AND ROLLING DIES FOR FORMING GEAR

(75) Inventor: Hiroji Okabe, Ota (JP)

(73) Assignee: Mitsuba Corporation, Kiryu-Shi (JP)

( * ) Notice: Subject to any disclaimer, the term of this patent is extended or adjusted under 35 U.S.C. 154(b) by 1243 days.

(21) Appl. No.: 11/795,524

(22) PCT Filed: Jan. 17, 2006

(86) PCT No.: PCT/JP2006/000503
§ 371 (c)(1),
(2), (4) Date: Jul. 18, 2007

(87) PCT Pub. No.: WO2006/077817
PCT Pub. Date: Jul. 27, 2006

(65) Prior Publication Data
US 2008/0141812 A1    Jun. 19, 2008

(30) Foreign Application Priority Data
Jan. 19, 2005 (JP) .................. 2005-011317

(51) Int. Cl.
*F16H 55/18* (2006.01)
*F16H 55/12* (2006.01)
*F16H 55/08* (2006.01)
*F16H 55/10* (2006.01)

(52) U.S. Cl. .............. 74/451; 74/440; 74/457

(58) Field of Classification Search ........... 74/409, 74/434, 440, 451, 457, 458, 460, 462, 422; 403/359.1, 359.6, 376; 464/158, 182
See application file for complete search history.

(56) References Cited

U.S. PATENT DOCUMENTS

| | | | |
|---|---|---|---|
| 280,428 A * | 7/1883 | Wilkinson | 74/466 |
| 742,812 A * | 10/1903 | Winton | 74/333 |
| 3,865,500 A * | 2/1975 | Newell | 403/359.5 |
| 4,373,925 A * | 2/1983 | Fickelscher | 464/158 |
| 4,754,659 A * | 7/1988 | Rietsch | 74/411 |
| 4,827,800 A * | 5/1989 | Pedersen et al. | 475/162 |
| 5,533,825 A * | 7/1996 | Stone | 403/359.6 |
| 6,193,232 B1 * | 2/2001 | Regimbal et al. | 271/272 |

(Continued)

FOREIGN PATENT DOCUMENTS

| | | |
|---|---|---|
| JP | U-53-1646 | 6/1976 |
| JP | U-53-34645 | 9/1976 |
| JP | U-54-95867 | 12/1977 |

(Continued)

OTHER PUBLICATIONS

Machine Translation for JP2001003947 A.*

*Primary Examiner* — Justin Krause
(74) *Attorney, Agent, or Firm* — Oliff & Berridge, PLC (57) ABSTRACT

A gear including a gear shaft, and a gear wheel made of a resin material, the gear wheel being fixed to the gear shaft by molding. The gear having a plurality of concave portions and convex portions that repeat in a circumferential direction. The plurality of concave and convex portions are arranged such that they extend in the axial direction of the gear shaft, and arranged such that the convex portions of one concave and convex group are adjacent to the concave portions of the other concave and convex group. Due to the relative displacement of the concave portions and the convex portions, stepped portions are formed at a boundary between the concave and convex groups in the circumferential direction of the gear shaft.

14 Claims, 5 Drawing Sheets

U.S. PATENT DOCUMENTS

| | | | |
|---|---|---|---|
| 6,713,917 B2 * | 3/2004 | Klar et al. | 310/90 |
| 8,011,266 B2 * | 9/2011 | Brackney | 74/440 |
| 8,052,535 B2 * | 11/2011 | Miyawaki | 464/83 |
| 2006/0199652 A1 * | 9/2006 | Fuhrmann | 464/158 |
| 2006/0291954 A1 * | 12/2006 | Igarashi et al. | 403/359.1 |
| 2011/0079100 A1 * | 4/2011 | Cusin et al. | 74/434 |
| 2011/0147112 A1 * | 6/2011 | Suzuki et al. | 180/444 |
| 2011/0308345 A1 * | 12/2011 | Makulec et al. | 74/438 |

FOREIGN PATENT DOCUMENTS

| | | |
|---|---|---|
| JP | B2-63-53406 | 10/1988 |
| JP | Y2-7-9095 | 3/1995 |
| JP | Y2-7-38754 | 9/1995 |
| JP | A-8-105307 | 4/1996 |
| JP | 2001003947 A * | 1/2001 |
| JP | A-2001-65666 | 3/2001 |
| JP | A-2002-372128 | 12/2002 |

* cited by examiner

GEAR AND ROLLING DIES FOR FORMING GEAR

CROSS-REFERENCE TO RELATED APPLICATIONS

This application is the U.S. National Stage of PCT/JP2006/300503, filed Jan. 17, 2006, which claims priority from JP 2005-011317, filed Jan. 19, 2005, the entire disclosures of which are incorporated by reference thereto.

BACKGROUND

The present invention relates to a gear and rolling dies for forming a gear.

Generally, wiper motors include a drive shaft that has a worm gear molded onto one end of the drive shaft. One example of a wiper motor includes a metal drive shaft, and a resin worm gear (corresponding to a gearwheel) that is molded onto one end of the metal drive shaft. It is important that the worm gear (or gearwheel) be fixed to the drive shaft so as not to come off and not to rotate with respect to the drive shaft. Conventionally, a serration groove having concavities and convexities repeated circumferentially, and a concave groove-like slit having a ring shape engraved in the circumferential direction at an intermediate portion in the axial direction, have been provided on an outer peripheral surface of the worm gear in order to prevent the worm gear from coming off and rotating with respect to the drive shaft (refer to, for example, Japanese Published Examined Patent Application No. S63-53406).

SUMMARY

However, in the conventional technique, because the width of the slit is narrow, there is insufficient retaining strength to prevent the worm gear from coming off from the drive shaft. Therefore, one suggestion has been to increase the width of the slit or provide a plurality of slits in the axial direction in order to increase the retaining strength. However, when either the width of the slit is widened or a plurality of slits are provided in the axial direction, the groove length in the axial direction of the serration groove becomes short and the strength for preventing rotation lowers. Therefore, another suggestion has been to make the worm gear thicker or make the outer diameter of the serration larger than the shaft. However, when either of these suggestions is adopted, the size of the gear becomes very large and machining the outer shaft becomes complicated.

A first aspect of the invention includes a gear with a gear shaft and a gear wheel made of a resin material. The gear wheel is fixed to the gear shaft by molding. The gear shaft includes a plurality of concave and convex groups that have concave portions and convex portions that repeat in the circumferential direction. The concave portions and convex portions are formed in the axial direction on the outer peripheral surface of the gear shaft at a portion to which the gear wheel is fixed. The concave and convex groups are disposed so as to arrange convex portions of one concave and convex group adjacent to concave portions of another concave and convex group. As a result, stepped portions are formed at the boundary between the concave and convex groups.

A second aspect of the invention includes the concave and convex groups that are serration grooves that have concave portions and convex portions repeated at a same pitch. Adjacent serration grooves are provided to make their phases different from each other.

A third aspect of the invention includes adjacent concave and convex groups that are serration grooves that have concave portions and convex portions repeated at pitches different from each other.

A fourth aspect of the invention includes adjacent concave and convex groups that are simultaneously formed by form rolling.

A fifth aspect of the invention includes one of the adjacent concave and convex groups that is formed by first form rolling, and the other is formed by a second form rolling after the first form rolling.

A sixth aspect of the invention includes inclined end faces reaching the concave portions that are formed on the stepped portions.

A seventh aspect of the invention includes concave and convex portions of the gear shaft that are formed by aligning in an axial direction the convex portions of a first rolling die with the concave portions of a second rolling die and rolling the first and second dies on an outer peripheral surface of the gear shaft.

An eighth aspect of the invention includes, on the ends at which the rolling dies are adjacent to each other, notched surfaces that are formed by slantingly notching the tip ends of the convex portions.

A ninth aspect of the invention includes notched surfaces that are formed by notching portions from the tip ends of the convex portions to intermediate portions between the convex portions and the concave portions.

A tenth aspect of the invention includes a plurality of rolling dies that are integrated together so that a plurality of concave and convex groups on the outer periphery of a gear shaft are formed by one form rolling process.

An eleventh aspect of the invention includes orthogonal surfaces, which are orthogonal to the axial direction of the first and second rolling dies, that are formed on sides of the concave portions of the first and second rolling dies.

According to the first aspect of the invention, at the boundary between the adjacent concave and convex groups of the gear shaft, stepped portions are formed due to relative displacement of the concave portions and the convex portions. The stepped portions help prevent the gearwheel from coming off the end of the gear shaft.

According to the second or third aspect of the invention, the reliable and firm prevention of rotation and prevention of coming-off are easily realized by forming the serration groove.

According to the fourth aspect of the invention, concave and convex groups with pitches different from each other in the circumferential direction can be easily formed by one form rolling process.

According to the fifth aspect of the invention, the shape of the stepped portion at the boundary of the concave and convex groups becomes complicated, so that the coming-off preventive effect can be increased.

According to the sixth aspect of the invention, filling of a resin material is reliably performed, and the gearwheel can be more reliably and firmly integrated with the gear shaft.

According to the seventh aspect of the invention, formation of a slit becomes unnecessary, and the machining efficiency of the gear shaft can be increased.

According to the eighth aspect of the invention, filling of a resin material when molding a gearwheel in a gear shaft can be effectively performed and the gearwheel can be more reliably and firmly integrated.

According to the ninth aspect of the invention, the coming-off preventive effect for the gearwheel is not lost, and filling of the resin material when molding the gearwheel in the gear shaft can be effectively performed.

According to the tenth aspect of the invention, a plurality of concave and convex groups can be formed by one form rolling process, and the machining efficiency can be improved.

BRIEF DESCRIPTION OF THE DRAWINGS

Various exemplary embodiments will be described with reference to the drawings, wherein.

DETAILED DESCRIPTION OF THE EXEMPLARY EMBODIMENTS

Next, embodiments of the present invention will be described with reference to the accompanying drawings.

Figure 1:
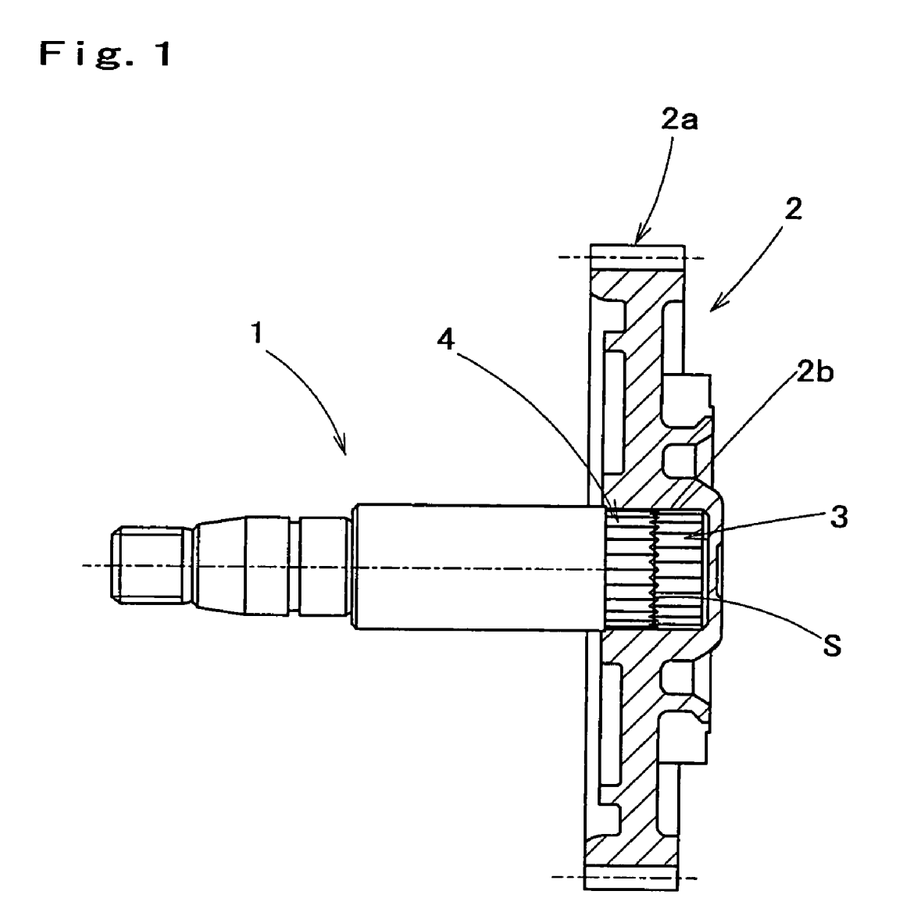
FIG. 1 is a sectional front view of a drive shaft.

In the drawings, reference numeral 1 denotes a drive shaft (as an example of a gear shaft of the present invention) of a wiper motor. A boss 2b of a worm gear 2 (as an example of a gear wheel of the present invention), which includes gear teeth 2a engraved on its outer periphery, is integrally fitted to one end of the drive shaft 1 and supported by the drive shaft 1. The worm gear 2 is integrated with one end of the drive shaft 1 by filling a space of a mold with resin material. One such method of filling a space of a mold includes injection molding. The worm gear 2 is formed so that the gear teeth 2a engage with a gear engraved on a motor output shaft (not shown). Accordingly, the worm gear 2 rotates in an interlocked manner with the gear of the motor when the motor is driven.

The drive shaft 1 is structured as follows in a first embodiment. On one end of the drive shaft 1 onto which the worm gear boss 2b is fitted, first and second serration grooves (as an example of concave and convex groups of the present invention) 3, 4 are engraved in parallel in the axial direction. The first and second serration grooves 3, 4 are formed so as to have the same diameter. The first serration groove 3 is formed on a first end portion of the drive shaft 1 in the axial direction of the boss 2b and has a length that is half the fitting length in the axial direction of the boss 2b. The first serration groove 3 may have triangular (other irregular shapes such as quadrilateral shapes are possible, of course) convex portions (mountain portions) 3a and concave portions (valley portions) 3b repeated at predetermined pitches in the circumferential direction on the outer peripheral surface of the drive shaft 1.

Figure 2A:
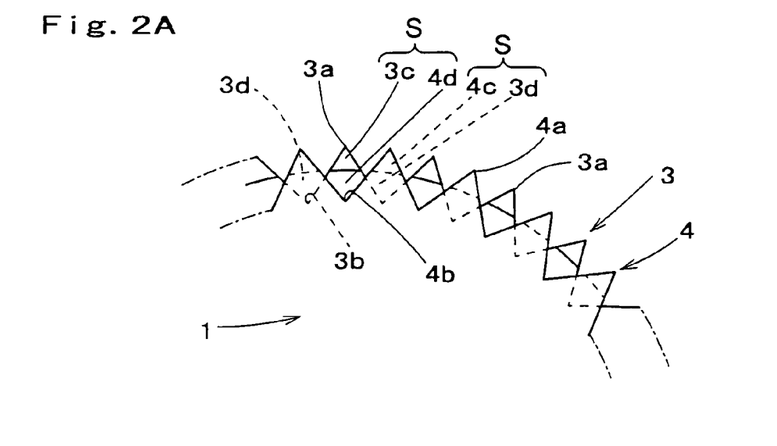
FIG. 2A is an enlarged side view of a main portion.

The second serration groove 4 is formed on a second end portion of the drive shaft 1 in the axial direction of the boss 2b. The second serration groove 4 has a length that is half the fitting length of the boss 2b in the axial direction, and is engraved so that convex portions 4a and concave portions 4b are repeated circumferentially at a same pitch as the convex and concave portions 3a, 3b in the first serration groove 3. FIG. 2A illustrates, in a simplified form, the points of the tops and bottoms of the first serration groove. The second serration groove 4 is engraved so as to shift (displace) its phase circumferentially by a ½ pitch from the first serration groove 3. Namely, the first and second serration grooves 3, 4 are arranged such that the second serration groove concave portions 4b are adjacent to the first serration groove convex portions 3a in the axial direction, and the second serration groove convex portions 4a are adjacent to the first serration groove concave portions 3b in the axial direction. As a result of this configuration, stepped portions S, which are based on a difference between the inner diameters of the convex portions 3a, 4a and the concave portions 3b, 4b, are integrally formed in the circumferential direction of the drive shaft 1 at the boundary between the first and second serration grooves 3, 4 (end faces orthogonal to the axial direction). The stepped portions S function similar to the slit by preventing the worm gear 2 from coming off the drive shaft 1.

Next, a method for forming the serration grooves 3, 4 on the drive shaft 1 will be described.

Figure 2B:
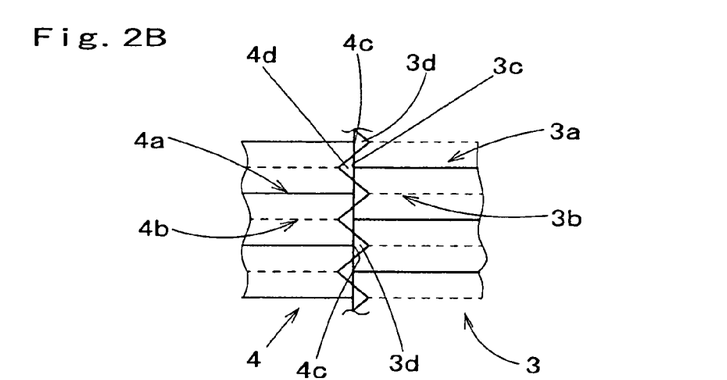
FIG. 2B is a front view of the main portion.
Figure 2C:
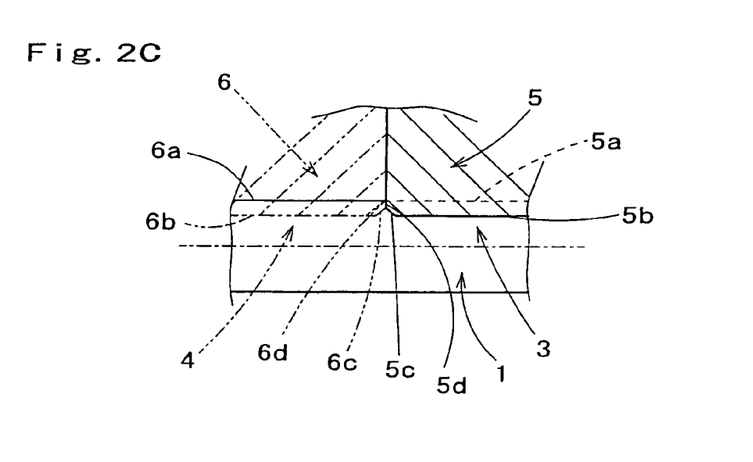
FIG. 2C is a front view describing a form rolling process by using rolling dies.
Figure 3:
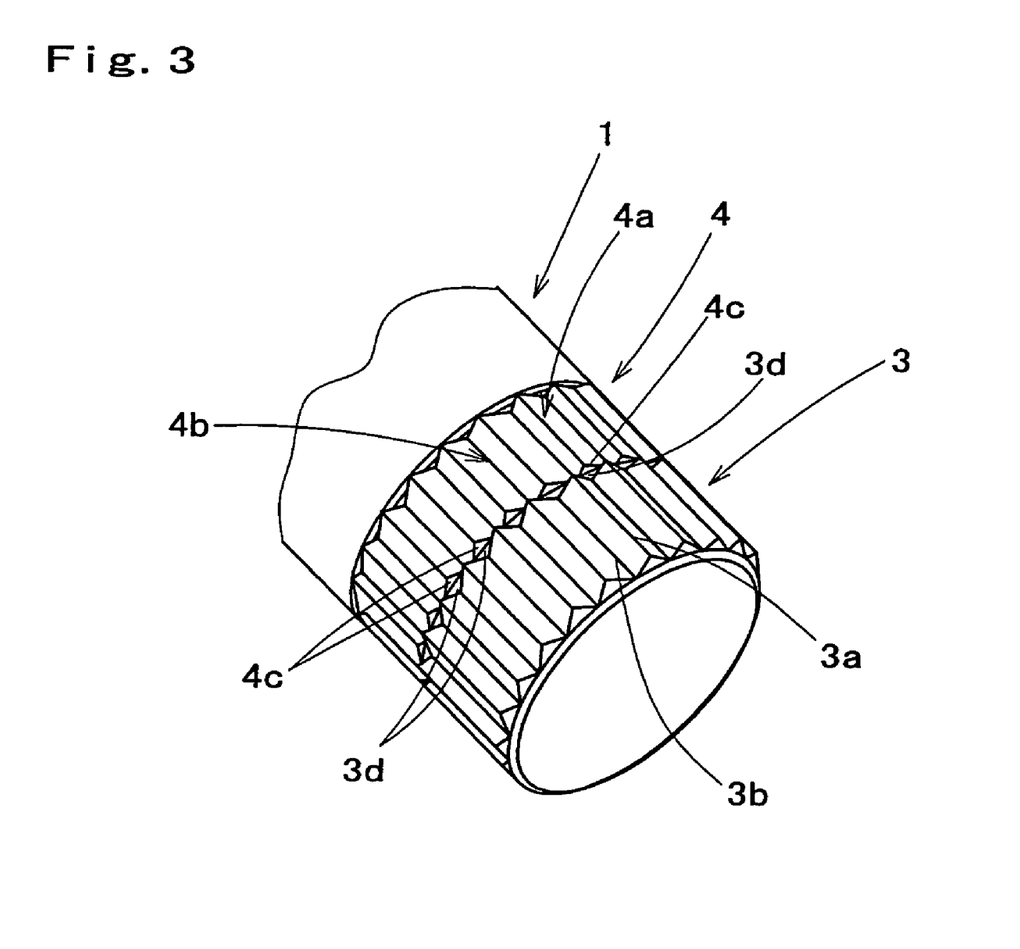
FIG. 3 is a perspective view of the main portion of the drive shaft.

In one embodiment, the first and second serration grooves 3, 4 are simultaneously formed by one form rolling. For example, the first and second serration grooves 3, 4 are formed by using cylindrical first and second rolling dies 5, 6 that have grooves formed on their outer peripheral surfaces. The pitches of the grooves of the first and second rolling dies 5, 6 are used to form the pitches of the convex portions 3a, 4a and the concave portions 3b, 4b of the first and second serration grooves 3, 4. The concave portions 5a, 6a and the convex portions 5b, 6b that face the convex portions 3a, 4a and the concave portions 3b, 4b of the serration grooves 3, 4 are formed to be long in the axial direction.

Additionally, on both sides in the axial direction of the convex portions 5b, 6b, there are notches that slant from the tip ends of the convex portions 5b, 6b to the sections between the convex portions 5b, 6b and the concave portions 5a, 6a, and to the intermediate portions reaching the concave portions 5a, 6a. Inclined notched surfaces 5c, 6c are thus formed on the sides of the convex portions 5b, 6b and orthogonal surfaces 5d, 6d orthogonal to the axial direction of the rolling dies 5, 6 are thus formed on the sides of the concave portions 5a, 6a. In this embodiment, the first and second rolling dies 5 and 6 are integrated so that the first rolling die convex portions 5b and the second rolling die concave portions 6a are arranged in a line in the axial direction. By performing form rolling by pressing the first and second rolling dies 5 and 6 against the drive shaft 1, the first and second serration grooves 3, 4 are formed on the drive shaft 1 by one form rolling. As a result, on the drive shaft 1, as described above, concave portions 3b of the first serration groove 3 and the convex portions 4a of the second serration groove 4 are formed so as to be arranged in a line in the axial direction, and at the boundary between the first and second serration grooves 3, 4; stepped portions S are formed.

Thus, when the drive shaft 1 is form-rolled by using the first and second rolling dies 5, 6, the groove depths of the first and second serration grooves 3, 4 are formed so as to correspond to the groove depths of the convex portions 5b, 6b and the concave portions 5a, 6a of the first and second rolling dies 5,6. On the adjacent ends of the first and second rolling dies 5, 6, inclined notched surfaces 5c, 6c are formed on the convex portion side from the convex portions 5b, 6b to the concave portions 5a, 6a. Orthogonal surfaces 5d, 6d are also formed on the sides of the concave portions 5a, 6a. Accordingly, when the driver shaft 1 is form-rolled by using the first and second rolling dies 5, 6, orthogonal end faces 3c, 4c are formed based on the die orthogonal surfaces 5d, 6d. The orthogonal end faces 3c, 4c that are formed are orthogonal to the axial direction of the drive shaft 1, and are formed at the boundary at which the first and second serration grooves 3, 4 are adjacent to each other, as shown in FIG. 2B, on the ends of the tip end sides (outer diameter sides) of the serration groove convex portions 3a, 4a. Additionally, inclined end faces 3d, 4d are formed based on the first and second rolling die notched surfaces 5c, 6c. The inclined end faces 3d, 4d are formed on the inner diameter sides of the serration groove concave portions 3b, 4b.

According to this method, when a worm gear 2 is formed by molding on one end of the drive shaft 1, because the resin material is guided so as to flow into the concave portions 3b, 4b through the inclined end faces 3d, 4d, the integration between the resin material and the drive shaft 1 becomes reliable and the integration in the circumferential direction becomes firm. Additionally, the worm gear 2 is reliably prevented from coming off in the axial direction by the orthogonal end faces 3c, 4c.

In FIG. 2B, the mountain folds as the peaks of the convex portions 3a, 4a are shown by solid lines, and valley folds as bottoms of the valleys of the concave portions 3b, 4b are shown by dotted lines.

In the first embodiment constructed as described above, the first and second serration grooves 3, 4 prevent the worm gear 2 from rotating. Furthermore, at the boundary between the grooves 3, 4, the convex portions 3a, 4a are positioned between the concave portions 4b, 3b of the other groove, and the end faces thereof are exposed in a staggered manner on both sides to form steps when they are viewed in the axial direction. The staggered exposed end faces (steps) function to prevent the worm gear 2 from coming off. As a result, even without engraving the conventional slit, the worm gear 2 can be prevented from coming off the drive shaft 1 by a high strength. Furthermore, it is not necessary to provide a slit, and the length of the drive shaft 1 can be shortened.

In addition, in this construction, by form rolling such that the first and second rolling dies 5, 6 are phase-shifted, phase-shifted serration grooves 3, 4 can be easily formed, and it becomes unnecessary to engrave the concave groove-like slit. Accordingly, the machining efficiency is improved.

Furthermore, in this construction, because notched surfaces 5c, 6c and orthogonal surfaces are formed on the rolling dies, orthogonal end faces 3c, 4c on the sides of the convex portions 3a, 4a are formed at the boundary between the first and second serration grooves 3, 4, and inclined end faces 3d, 4d are formed on the sides of the concave portions 3b. Additionally, when the worm gear 2 is formed by molding, the resin material is filled so as to be guided to the sides of the concave portions 4b, 3b by the inclined end faces 3d, 4d, so that the worm gear 2 is reliably and firmly integrated. Because the orthogonal end faces 3c, 4c are formed on the sides of the convex portions 3a, 4a, the worm gear 2 is reliably prevented from coming off the drive shaft 1. As a result, an excellent gear can be provided.

In this construction, by integrating the first and second rolling dies 5 and 6 during the form rolling process, the first and second serration grooves 3, 4 can be formed by one form rolling. Thus, the machining efficiency is improved.

Figure 4:
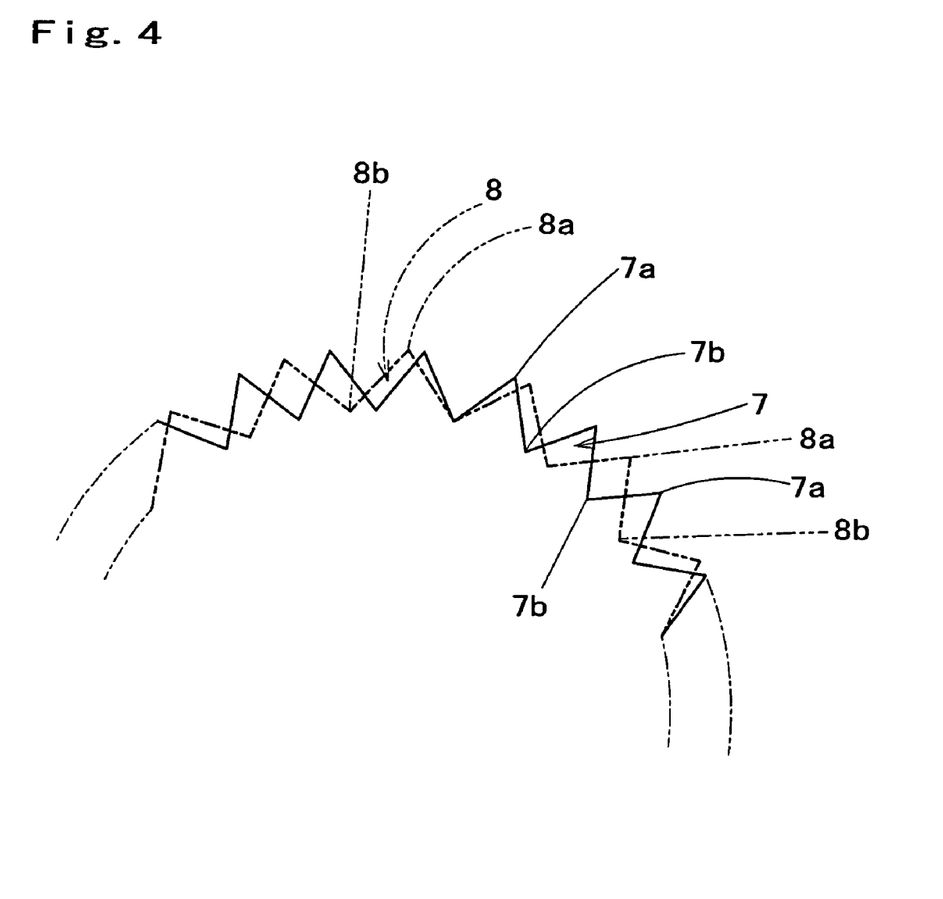
FIG. 4 is an enlarged side view of a main portion of a drive shaft according to a second embodiment.

The present invention is not limited to the above-described embodiment. For example, a second embodiment, as shown in FIG. 4, is possible. In this embodiment, when the first and second convex and concave groups (serration grooves) 7, 8 are formed on the drive shaft 1, even if the circumferential pitches of the convex portions 7a, 8a and the concave portions 7b, 8b are made different from each other, by making the convex portions and concave portions 7a, 8b, and 8a, 7b adjacent to each other in the axial direction, stepped portions can be formed in the circumferential direction.

Figure 5:
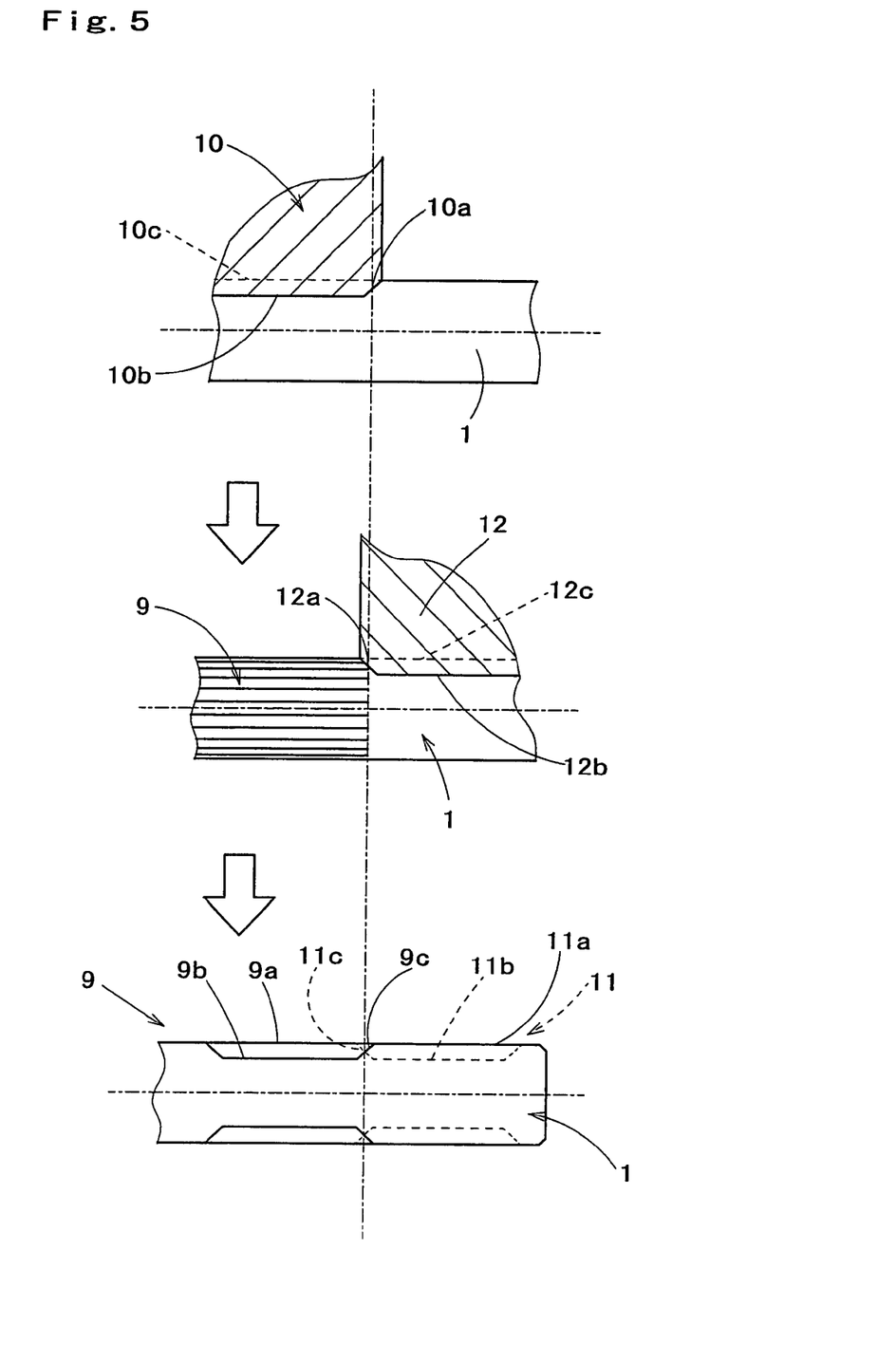
FIG. 5 is a main portion front view showing a form rolling process of a drive shaft according to a third embodiment by using rolling dies.

Furthermore, a third embodiment, as shown in FIG. 5, is also possible. In this embodiment, the first concave and convex group 9 to be formed on the drive shaft 1 is formed by form rolling using the first rolling die 10. Thereafter, the second concave and convex group 11 is formed by form rolling using the second rolling die 12 so as to shift the phase by ½ at the same pitches. Like the first embodiment, inclined notched surfaces 10a, 12a are formed on the first and second rolling dies 10, 12. In this construction, the notched surfaces 10a, 12a are entirely inclined surfaces from the convex portions 10b, 12b to the concave portions 10c, 12c. Accordingly, as shown in FIG. 5, at the boundary between the first and second convex portions 9a, 11a, inclined portions 9c, 11c are formed to reach the concave portions 11b, 9b. In this case, by setting the first die 10 for forming the first concave and convex group 9 and the second die 12 for forming the second concave and convex group 11 in a positional relationship in which they overlap at the boundary, steps due to the shifting in the axial direction can be formed at the boundary. Thus, the integrating strength in the rotation stopping direction can be further increased.

The number of concave and convex groups to be arranged in the axial direction are not necessarily limited to two. For example, the number of concave and convex groups may be set to 3 or more if necessary. As the number of concave and convex groups increases, the number of boundaries increase. Thus, the higher coming-off preventive function is obtained. Thus, the higher coming-off preventive function is obtained. Furthermore, the plurality of concave and convex groups may be formed while being made different in length in the axial direction.

What is claimed is:

1. A gear comprising:
   a single gear shaft; and
   a gear wheel made of a resin material, the gear wheel being fixed to an outer peripheral surface of the single gear shaft by molding, wherein:
   a plurality of serration groups in which valley and peak portions engraved in parallel in the axial direction repeat in a circumferential direction, are formed integrally to an outer peripheral surface of the gear shaft at a portion to which the molded gear wheel is fixed to prevent the gear wheel from being rotatable relative to the gear shaft in the circumferential direction,
   the plurality of serration groups are formed adjacent to one another in the axial direction at the outer peripheral surface of the gear shaft to which the gear wheel is fixed,
   the adjacent serration groups are arranged offset with one, another in the circumferential direction such that peak portions of one serration group are next to valley portions of another serration group in the axial direction,
   stepped end faces are formed at an edge surface of the adjacent serration groups based on a difference between inner diameters of the peak portions of one serration group and the valley portions of the another serration group, and
   the stepped end faces function to prevent the molded gear wheel from coming off from the gear shaft.

2. The gear according to claim 1, wherein the serration groups are serration grooves that have the valley portions and the peak portions repeated at a same pitch, and adjacent serration grooves are provided such that phases of the adjacent serration grooves are different from each other.

3. The gear according to claim 1, wherein the adjacent serration groups are serration grooves that have the valley portions and the peak portions repeated at different pitches.

4. The gear according to claim 1, wherein the adjacent serration groups are simultaneously formed by form rolling.

5. The gear according to claim 1, wherein the one serration group of the adjacent serration groups is formed by first form rolling, and the other serration group is formed by second form rolling after forming the one serration group.

6. The gear according to claim 1, wherein inclined end faces reaching the valley portions are formed on the stepped portions.

7. The gear according to claim 1, wherein the peak portions include orthogonal end faces that are formed on an end at which the boundary between the adjacent serration groups is formed.

8. The gear according to claim 1, wherein the valley portions include inclined end faces that are formed on sides of the valley portions and are continuous with adjacent peak portions.

9. The gear according to claim 1, wherein the adjacent serration groups are offset by a half pitch.

10. A gear comprising:
   a single gear shaft; and
   a gear wheel made of a resin material, the gear wheel being fixed to an outer peripheral surface of the single gear shaft by molding, wherein:
   a serration groove, in which peak and valley portions engraved in parallel in an axial direction repeat in a circumferential direction, are formed integrally to an outer peripheral surface of the gear shaft at a portion to which the molded gear wheel is fixed to prevent the gear wheel from being rotatable relative to the gear shaft in the circumferential direction,
   the serration groove comprising:
      a first serration groove having peak and valley portions; and
      a second serration groove having peak and valley portions, the second serration groove being adjacent to the first serration groove in an axial direction,
   the peak and valley portions of the first and second serration grooves are repeated at a same pitch in a circumferential direction on an outer peripheral surface of the gear shaft,
   the first serration groove is arranged offset by a half pitch from the second serration groove in the circumferential direction such that peak portions of the first serration groove are next to valley portions of the second serration groove in the axial direction,
   stepped end faces are formed at an edge surface of the first and second serration grooves based on a difference between inner diameters of the peak portions of the first serration groove and the valley portions of the second serration groove, and
   said stepped end faces function to prevent the molded gear wheel from coming off from the gear shaft.

11. The gear according to claim 10, wherein a phase of the second serration groove is shifted by a half pitch from the first serration groove.

12. The gear according to claim 10, wherein the first serration groove and the second serration groove are arranged so that the valley portions of the second serration groove are adjacent to the peak portions of the first serration groove.

13. The gear according to claim 10, wherein the peak portions include orthogonal end faces that are formed at the boundary.

14. The gear according to claim 10, wherein the valley portions include inclined end faces that are formed on sides of the valley portions and are continuous with adjacent peak portions.

* * * * *

UNITED STATES PATENT AND TRADEMARK OFFICE
CERTIFICATE OF CORRECTION

| | |
|---|---|
| PATENT NO. | : 8,286,525 B2 |
| APPLICATION NO. | : 11/795524 |
| DATED | : October 16, 2012 |
| INVENTOR(S) | : Hiroji Okabe |

It is certified that error appears in the above-identified patent and that said Letters Patent is hereby corrected as shown below:

On the Title Page, please correct the PCT No. to read as follows:

Item (86), please change "PCT/JP2006/000503" to --PCT/JP2006/300503--.

Signed and Sealed this
Twenty-ninth Day of January, 2013

David J. Kappos
*Director of the United States Patent and Trademark Office*